F. V. UBEZZI.
VEHICLE WHEEL.
APPLICATION FILED MAR. 11, 1915.
1,144,879.
Patented June 29, 1915.
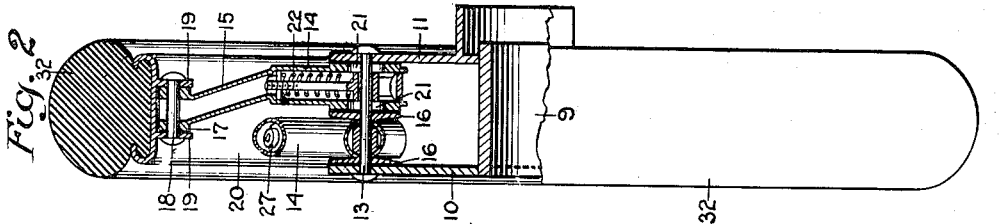
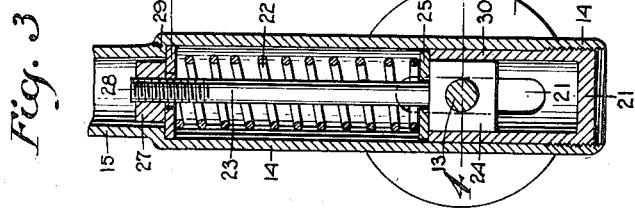
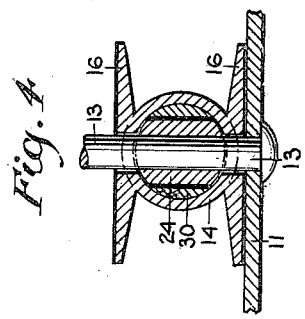
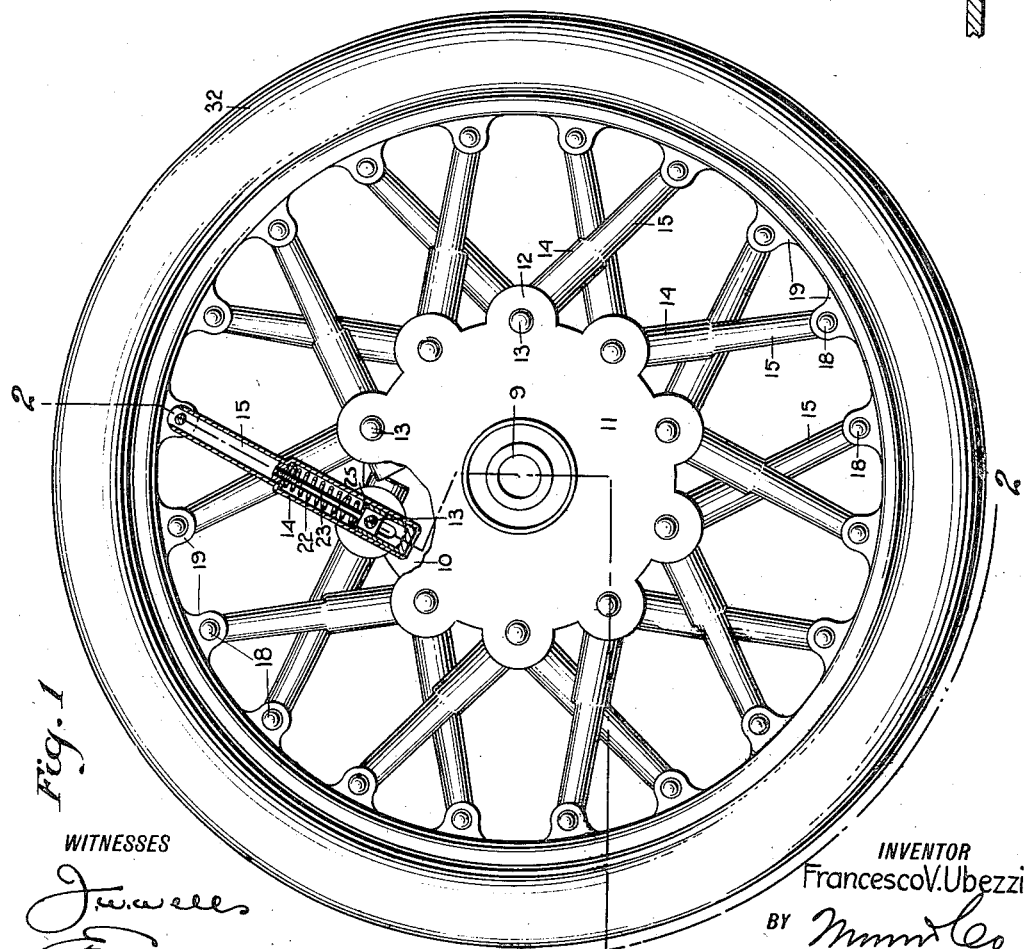
WITNESSES
INVENTOR
Francesco V. Ubezzi
BY
ATTORNEYS

UNITED STATES PATENT OFFICE.

FRANCESCO V. UBEZZI, OF NEW YORK, N. Y., ASSIGNOR TO TRANSCONTINENTAL WHEEL CO., INC., OF NEW YORK, N. Y., A CORPORATION OF NEW YORK.

VEHICLE-WHEEL.

1,144,879.   Specification of Letters Patent.   Patented June 29, 1915.

Application filed March 11, 1915. Serial No. 13,720.

*To all whom it may concern:*

Be it known that I, FRANCESCO V. UBEZZI, a subject of the King of Italy, and a resident of the city of New York, borough of Manhattan, in the county and State of New York, have invented a new and Improved Vehicle-Wheel, of which the following is a full, clear, and exact description.

Among the principal objects which the present invention has in view are: to provide a wheel having two series of yielding, supporting spokes, said series being disposed in outwardly-converged frusto-conical planes; to provide supporting spokes adapted to yield in lines parallel with the central plane of the wheel, said spokes having bearing ends disposed in lines inclined to said plane to resist the side thrust of said wheel; and to simplify the construction of a wheel of the character mentioned.

*Drawings.*—Figure 1 is a side view of a wheel constructed and arranged in accordance with the present invention, part of the hub of the wheel being cut away and one of the spokes being sectioned to show the interior construction thereof; Fig. 2 is a cross section taken as on the staggered line 2—2 in Fig. 1; Fig. 3 is a detail view on an enlarged scale, showing in longitudinal section the butt-end portion of one of the hubs. Fig. 4 is a cross section taken as on the line 4—4 in Fig. 3.

*Description.*—As seen in the drawings, the wheel therein shown has a hub embodying a bearing box 9 concentric with and rigidly attached to cheek-plates 10 and 11. The cheek-plates 10 and 11, at the perimeters thereof, have extensions pierced by rivet bolts 13, which bolts structurally unite said plates. When said bolts are headed, they maintain the cheek-plates in adjusted position against the spreading action of the spokes of said wheel.

The spokes of the wheel are integrally formed. For the purpose of description, however, the spokes are divided into the inner section 14 and the outer section 15, as best seen in Fig. 2 of the drawings. The axis of the inner section of each spoke is parallel with the central plane of the wheel and is perpendicular to the axis of the hub 9. The spokes are arranged in pairs, as shown in Fig. 2 of the drawings, one pair being guided and supported by each of the bolts 13. The two members of each pair of spokes have a bearing and sliding relation with each other and each with one of the cheek-plates 10 and 11. To ease the bearing thus formed between the spokes and cheek-plates the inner section 14 of each spoke is provided on both sides thereof with a disk-like bearing plate 16. Where said bearing plates are juxtaposed, they provide a sliding surface for each other. Where they engage the cheek-plates, they form a bearing surface therewith. From the outer end of each of the inner sections 14 of the spokes the outer section 15 slants toward the end having the boss 17 which is pivotally mounted on a pivot bolt 18 set in lugs 19. The boss 17 is rounded to avoid engaging the rim 20 of the wheel, thus permitting freedom of movement on the part of the spokes in their relation to said rim. The lugs 19 are integrally formed on and with said rim and equally spaced with reference to the central plane of the wheel. The plate 16 and inner sections 14 of said spokes are provided with elongated slots 21. The slots 21 straddle the bolts 13 and form guides in connection therewith for the operation of the sections 14 of the spokes. The weight carried on the hub, cheek-plates 10 and 11, and the bolts 13 connecting the same, is supported by heavy coil springs 22, one of which is mounted in each of the spokes, in the inner section 14 thereof.

The springs 22 are guided by supporting bolts 23. The bolts 23 are integrally formed with or rigidly secured to sliding blocks 24, one of which is mounted on each of the rivet bolts 13. The springs 22 are carried between compression plates 25 and 26, the former being seated upon the blocks 24, and the latter being free to slide on the bolts 23 and being held in place by nuts 27, which engage screw-threaded sections 28 at the ends of the bolts 23. The plates 26 are each supported on shoulders 29 formed at the junction of the inner and outer sections 14 and 15, respectively. Therefore, any movement by the spokes inward toward the bolt 13 with which it is connected operates to compress the spring between the block 24 and plate 25 and said plates 26. The plates 26 are held in operative relation to the inner section 14 by a lining 30. The lining 30 has a closed head 31, and is screw-threaded at the outer end to register with threads formed at the inner end of the section 14.

The lining 30 is slotted to conform with the slots 21, as seen best in Fig. 3 of the drawings. By manipulating the lining 30 to carry the same into or remove it from the spoke, the operating link of said spoke is altered, or the tension of the springs 22 is varied. The rim 20 being suspended or held in operative relation to the hub by means of said spokes and springs 22 therewith connected, there is avoided the necessity of using a pneumatic or hollow tire. The tire 32 shown in the drawings is held in service position to the rim 20 by any of the conventional means employed to this end.

While I have herein shown a solid tire 22, it will be understood that I am not limited to such a construction, as in some instances I prefer to employ a softer or partly collapsible tire. The necessity, however, for using a pneumatic tire is overcome by the resiliency of the spokes and the springs 22 supporting the same.

*Operation.*—With a wheel constructed as shown in the accompanying drawings and as described herein, the weight which is imposed on said wheel through the axle of the vehicle and the hub of the wheel and the plates 10 and 11 thereof, operates to compress the springs 22 in the lower half of the wheels, to that end moving the blocks 24 and plates 25 toward the plates 26. The plates 26 in the lower region of the wheel are held immovable by the ground on which the wheel rests and the outer sections 15 of the spokes. Simultaneously the springs in the spokes at the upper half of the wheel are compressed due to the movement of the blocks 24 away from the upper perimeter of the wheel and relatively from the outer sections 15 of the spokes. The nuts 27 and plates 26, being rigidly connected with said blocks, move therewith, while the plates 25, resting on the lining 30, remain fixed in their relation to the spokes. The result of this action is that the springs 22 in the upper half of the wheel are compressed equally with the springs 22 in the lower half of the wheel; or, in other words, the carrying strain is distributed to the springs in both the upper and lower sections of said wheel. Interference with the action of the wheel by the laterally-extended springs is at all times avoided, due to the pivotal connections of said spokes with the bolts 13 and 18, thus flexibly and freely uniting the cheek-plates 10 and 11 and the rim 20.

Claims:

1. In combination, a solid tire; a supporting rim therefor embodying a plurality of pivotal connectors disposed in line and at both sides of the central plane of said rim; a hub having cheek-plates disposed in spaced relation at both sides of said plane; a plurality of spokes uniting said rim and said cheek-plates, said spokes being disposed in positions divergent to the radii of said wheel and to said plane; means pivotally connecting said spokes and said rim and cheek-plates in service position; and resilient means interposed between said cheek-plates and each of said spokes for thrusting said spokes outward from said cheek-plates, said means embodying coil springs, pivot bolts, each of said bolts connecting one of said spokes to one of said cheek-plates in sliding relation thereto, and a plurality of compression plates supported by said springs at both ends thereof, said plates being disposed in pairs and operatively connected, one with each of said bolts and one with each of said spokes.

2. In combination, a solid tire; a supporting rim therefor embodying a plurality of pivotal connectors disposed in line and at both sides of the central plane of said rim; a hub having cheek plates disposed in spaced relation at both sides of said plane; a plurality of spokes uniting said rim and said cheek-plates, said spokes being disposed in positions divergent to the radii of said wheel and to said plane; means pivotally connecting said spokes and said rim and cheek-plates in service position; resilient means interposed between said cheek-plates and each of said spokes for thrusting said spokes outward from said cheek-plates, said means embodying coil springs, pivot bolts, each of said bolts connecting one of said spokes to one of said cheek-plates in sliding relation thereto, and a plurality of compression plates supported by said springs at both ends thereof, said plates being disposed in pairs and operatively connected, one with each of said bolts and one with each of said spokes; a plurality of supporting bolts permanently connected with each of said pivot bolts and extending through said springs and said compression plates; and means mounted on said bolts for holding said springs under compression.

3. In combination, a solid tire, a supporting rim therefor embodying a plurality of pivotal connectors disposed in line and at both sides of the central plane of said rim; a hub having cheek-plates disposed in spaced relation at both sides of said plane; a plurality of spokes uniting said rim and said cheek-plates, said spokes being disposed in positions divergent to the radii of said wheel and to said plane; means pivotally connecting said spokes and said rim and cheek-plates in service position; resilient means interposed between said cheek-plates and each of said spokes for thrusting said spokes outward from said cheek-plates, said means embodying coil springs, pivot bolts, each of said bolts connecting one of said spokes to one of said cheek-plates in sliding relation thereto, and a plurality of compression plates supported by said springs at both ends thereof, said plates being disposed in pairs and operatively connected, one with each of said bolts and one with each of said spokes; a plurality of supporting bolts permanently connected with each of said pivot bolts and extending through said springs and said compression plates; and a plurality of screw nuts operatively engaging said bolts for varying the operative position of the adjacent compression plate.

4. In combination, a solid tire; a supporting rim therefor embodying a plurality of pivotal connectors disposed in line and at both sides of the central plane of said rim; a hub having cheek-plates disposed in spaced relation at both sides of said plane; a plurality of spokes pivotally connecting said rim and said cheek-plates, said spokes being disposed in positions divergent to the radii of said wheel, said spokes each having an inner section disposed in service approximately parallel to said plane, and an outer section divergent from said plane; and a plurality of spiral springs mounted within said inner section of said spokes, resting upon said spokes and the pivotal connection thereof with said cheek-plates to maintain said spokes in supporting relation to said rim.

In testimony whereof I have signed my name to this specification in the presence of two subscribing witnesses.

FRANCESCO V. UBEZZI.

Witnesses:
EUGENE J. ORSENIGO,
HENRY ORSENIGO.